Feb. 22, 1955
L. X. GARFUNKEL
2,702,405
APPARATUS FOR MOLDING COMMINUTED MATERIAL
Filed March 4, 1952
3 Sheets-Sheet 1
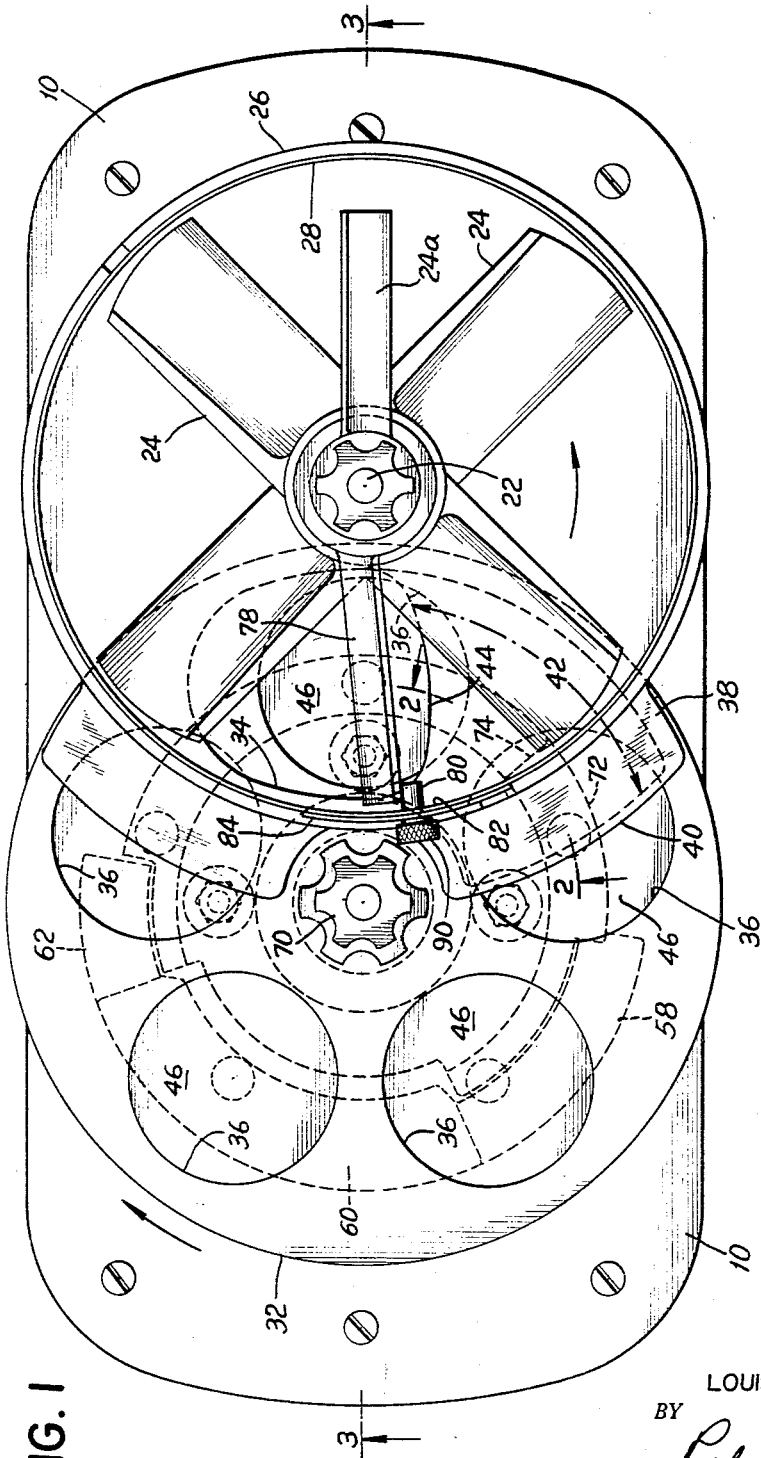
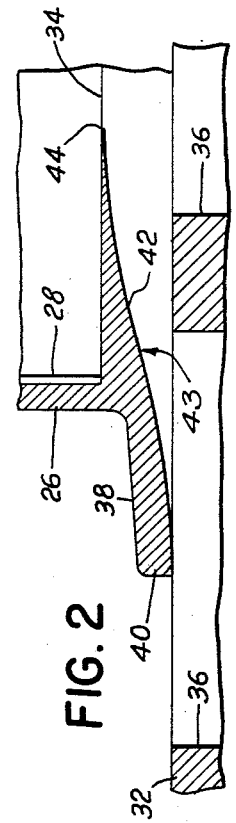
*INVENTOR.*
LOUIS X. GARFUNKEL
BY
*Robert S. Dunham*
ATTORNEY

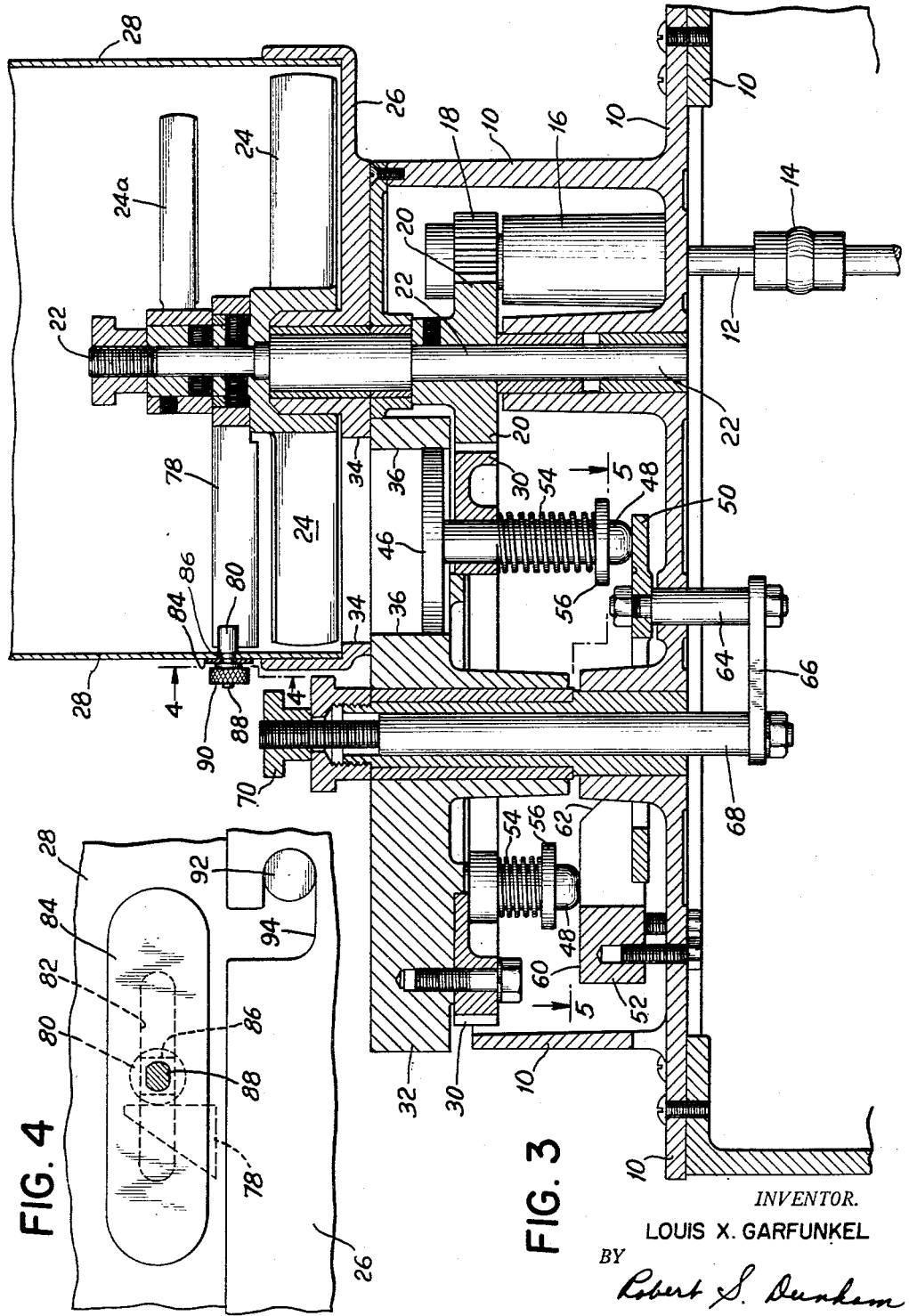

Feb. 22, 1955 L. X. GARFUNKEL 2,702,405
APPARATUS FOR MOLDING COMMINUTED MATERIAL
Filed March 4, 1952 3 Sheets-Sheet 3

INVENTOR.
LOUIS X. GARFUNKEL
BY
Robert S. Dunham
ATTORNEY

United States Patent Office 2,702,405
Patented Feb. 22, 1955

2,702,405
APPARATUS FOR MOLDING COMMINUTED MATERIAL

Louis X. Garfunkel, New York, N. Y.

Application March 4, 1952, Serial No. 274,735

14 Claims. (Cl. 17—32)

This invention pertains to machines for molding plastic material, and more particularly relates to improvements in a machine for forming patties of comminuted material, such as particularly hamburger (e. g. beef ground as customary for such product) and other moldable mixtures.

In a machine known in the art, and over which this invention provides improvements, hamburger, for example, is placed more or less en masse in a hopper which is mounted on a container base. A revolving propeller paddle pushes the desired amount of hamburger through an orifice in the bottom of the container base and into cylindrical molds where patties are formed. The molds are carried on a revolving turntable, and the depth of each mold is defined by the top of a piston. The pistons have downwardly extending stems, the lower ends of which ride upon a cam at one location and upon an adjustable cam plate at another, as will appear. When a given mold is generally beneath the container base orifice it may be said to be at the filling station, and the top of its piston is a predetermined maximum depth below the top of the turntable. At this point, further, the bottom of the piston stem rides upon the horizontal cam plate. The mold, which is now filled with hamburger, proceeds to an ejection station. After leaving the filling station at some point intermediate the filling and ejecting stations, the bottom of the piston stem leaves the cam plate and engages a cam, riding upwardly along a ramp which is a part of the cam, until the top of the piston is flush with the top of the turntable. At this point, the cam surface becomes horizontal, i. e. parallel to the top of the turntable, leaving a hamburger patty unrestricted on the table and ready for removal therefrom, as by a spatula. The bottom of the piston stem next rides downward along another ramp (also part of the cam) until removed therefrom by encountering the cam plate. At this point, that mold has completed its cycle and is ready to be filled once more.

Still referring to the known machine, the cam plate is vertically adjustable so that the depth to which the molds will be filled, and hence the weight of each patty, can be accurately controlled within predetermined limits.

Horizontally extending in the direction of rotation of the turntable from the bottom of the container base is a lip terminated by a scraper edge flush with the top of the turntable and designed to remove any excess hamburger above the top of the turntable. The underside of the lip is hollowed out to form a chute extending downwardly from a fine edge at the orifice and terminating adjacent the scraper edge. The purpose of the chute is to guide the hamburger from the orifice into the molds. In the past, the vertical longitudinal cross-section has either been a straight line taper or a straight line taper with a vertical drop-off near the scraper edge.

Positioned above the propeller paddle is a meat stop or blade which tends to break up the viscous mass of hamburger to prevent it from being picked up and rotated by the propeller paddle. The meat stop in the past has been positioned directly above the orifice and held in that position by a fixed inward projection from the hopper wall. The hamburger being forced around by the propeller paddle is crowded against the meat stop which assists the propeller paddle in compressing the hamburger into the mold openings.

Such a machine in general gives satisfactory results, producing from about 1200 to about 3600 patties an hour. It has been found, however, that due to one or more of a variety of causes, an undesirable amount of hamburger pressure tends to be built up in the system, with the result that the patties produced are more compressed and (when subsequently cooked) tougher than would be the case without such undesirable pressure. Such undue compression furthermore squeezes juice out of the hamburger, thereby impairing its flavor when cooked.

In addition, the undue pressure tends to cause the patties to expand as they emerge from under the scraper edge. This expansion takes the form of a bulge extending above the turntable top at the leading edge of the mold as it passes the scraper edge.

I have found that by dropping the piston a fraction of an inch after the trailing edge of the mold has substantially cleared the orifice and before the leading edge of the mold passes the scraper edge, the pressure may be sufficiently relieved that a true patty will result, i. e. one with no upward bulge at its leading edge.

In addition, I have found that the pressure can be relieved by shaping the cross-section of the chute between the orifice and the scraper edge in the shape of an S-curve having substantially horizontal end portions and a reflex point therebetween.

Furthermore by making the position of the meat stop adjustable, the machine can be more readily accommodated to patties of different depths. When lowering the cam plate to make thicker patties, the meat stop should be moved in one direction, and when raising the cam plate to make thinner patties, the meat stop should be moved the other way. More particularly, when thicker patties are desired, the meat stop should be moved closer to the knife edge to permit more hamburger to pass readily through the orifice.

Important objects of the invention are to provide all the above-enumerated refinements (with their respective advantages) upon the prior art machine.

The above and other objects and advantages will appear more clearly from the following description, taken with the accompanying drawings in which:

Fig. 1 is a plan view of the machine showing certain of the present improvements, some of which appear as broken lines;

Fig. 2 is an enlarged sectional view taken on line 2—2 of Fig. 1 and showing an S-shaped chute;

Fig. 3 is a sectional view taken on line 3—3 of Fig. 1;

Fig. 4 is an enlarged sectional view taken on line 4—4 of Fig. 3 and showing means for adjusting the position of the meat stop;

Like reference numerals denote like parts in the various views.

Figure 5:
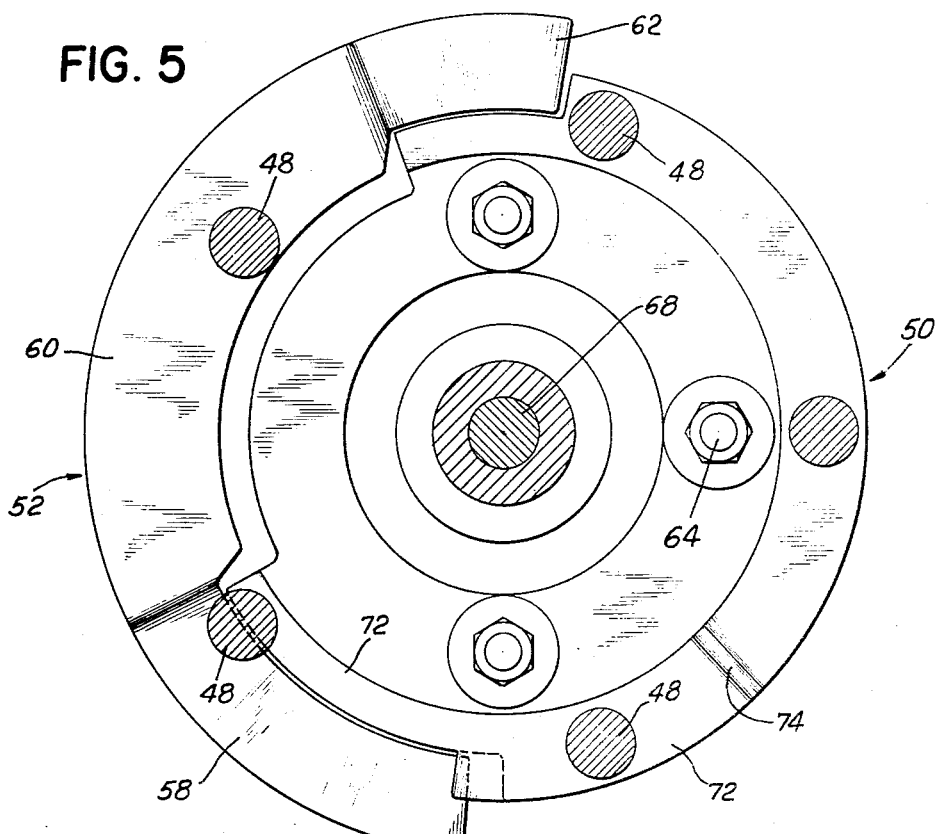
Fig. 5 is an enlarged sectional view taken on line 5—5 of Fig. 3 and showing the cam and the cam plate.

Proceeding first with a general description of the machine and referring particularly to Fig. 3, there is illustrated a machine for forming cylindrical or other shaped patties of hamburger or other comminuted material. Most of the operating parts are positioned above a base structure 10, and include a main drive shaft 12 which is connected through a flexible coupling 14 to a power source (not shown) which may conveniently be an electric motor. The shaft 12 is within a post 16 which extends upwardly from the base structure 10, and the shaft 12 is provided at its upper end with a driving gear 18. The gear 18 meshes with a larger gear 20 to rotate a vertical shaft 22, and the shaft 22 carries near its upper end a revolving propeller 24 which as shown in Fig. 1 has four blades which revolve in a counterclockwise direction as seen in Fig. 1.

The propeller 24 is positioned close to the bottom of a container base 26 which carries a cylindrical meat supply hopper 28.

The gear 20 meshes with and drives a further gear 30 which rigidly carries on its upper surface a turntable 32 to drive the turntable in a clockwise direction as seen in Fig. 1.

The container base 26 is provided with an orifice 34 at the bottom thereof, and the propeller 24 is adapted to force predetermined amounts of hamburger downwardly through the orifice 34 and into whichever one of a plurality of molds 36 (five are shown) that happens to be beneath the orifice 34, the molds 36 being provided in and thus rotated with the turntable 32.

The container base 26 has a lip portion 38 which projects horizontally from the bottom thereof in the direction of mold motion, and which is terminated by a scraper edge 40. The underside of the projection or lip 38 is hollowed out to provide a chute 42 inclined downwardly from the orifice 34 to the scraper edge 40. The outline of the area of the chute 42 is indicated by the designated dash lines in Fig. 1. In vertical longitudinal cross-section as seen in Fig. 2, the chute 42 is formed in the shape of an S-curve which is substantially horizontal at its two ends and has a reflex point 43 about midway therebetween. The upper part of the chute forms a fine or thin edge 44 at the orifice 34. This edge 44 has a curved configuration when viewed from above, as in Fig. 1. The radius of this curvature is substantially greater than a radius from the center of the orifice 34. The reasons for this will be set forth more fully below. As aforesaid, where the chute 42 is S-shaped, the meat pressure does not build up as excessively as is the case where a chute, having a straight taper or a straight taper with a vertical drop-off at its lower end, is used.

Referring again to Fig. 3, it will be seen that the bottom of each mold 36 is formed or defined by the upper surface of a piston 46 having a downwardly extending stem 48, which rests upon either a cam plate 50 or a fixed cam 52 depending upon the location of the piston 46. The lower ends of the piston stems 48 are maintained in contact with the cam plate 50 or the cam 52 by means of springs 54, the upper ends of which engage the gear 30 and the lower ends of which are held against retainers 56.

As each mold 36 is approximately directly underneath the orifice 34, its piston 46 is in its lowermost position (except for a special, further drop as explained more fully below), leaving a cylindrical cavity into which hamburger can be pushed by the blades of the propeller 24 or some other controlled feed. This position (which defines the size of the cavity as it is actually filled, and which thus determines the amount of ground meat in each patty) will sometimes hereafter be referred to as the filling station, at which the lower end of the piston stem 48 rests upon the main portion of the cam plate 50. As the turntable 32 rotates as aforesaid, and some time after leaving the filling station, the piston 46 engages a ramp 58 of the cam 52 and rides upwardly therealong until the horizontal portion 60 of the cam 52 is reached, at which time the top of the piston 46 will be flush with the top of the turntable 32, leaving the hamburger patty lying in effect upon an unrestricted table, where it can be easily removed from the machine, as by a spatula. This position will sometimes be referred to hereafter as the ejector station.

After leaving the ejector station, the lower end of the piston stem 48 next encounters a down ramp 62 which is followed until the cam plate 50 is once more reached, somewhere in advance of returning to the filling station. At this point, the piston will again be in its regular lower position (as above described) and the cavity 36 will be ready to be filled again.

As seen in Fig. 3, the cam plate 50 is rigidly mounted upon a plurality of studs 64 which are linked by a plate 66 to a cam plate adjusting shaft 68, surmounted by an easily accessible adjusting nut 70. By turning the nut 70, the cam plate 50 may be moved either up or down, and the depth of the piston 46 below the top of the turntable 32 when at the filling station is thus regulable within predetermined limits, to adjust the thickness and weight of the patty.

Figure 6:
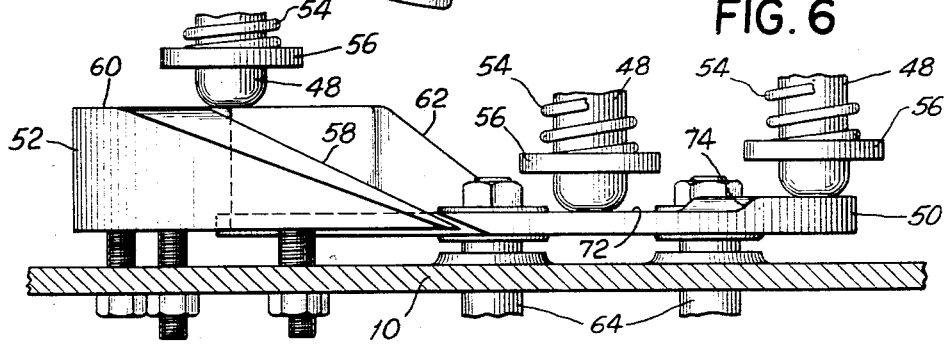
Fig. 6 is a side view of the cam and the cam plate showing a means for dropping the piston stems and hence the pistons a fraction of an inch immediately after the molds pass the orifice.

As stated above, I have found that a system as described above tends to build up excessive pressure, and one effect of such pressure is that as the molds emerge past the scraper edge 40 and the pressure is relieved, the mixture tends to expand upward forming an upward bulge at the leading edge of the mold. Therefore, means may be provided abruptly to lower the pistons 46 a fraction of an inch before the mold 36 emerges past the scraper edge 40. To provide such means (as best illustrated in Figs. 5 and 6), the cam plate 50 is slightly undercut as at 74, so that as the pistons 46 pass the location 74, the piston springs 54 and gravity will cause the lower ends of the stems 48 to drop abruptly onto a horizontal undercut portion 72 of the cam plate 50. The effect of this construction is to provide relief for the pressure of the hamburger or other moldable material by providing additional volume into which the patty can expand within the molds 36 without the afore-mentioned upward bulging.

As aforesaid, the piston stems 48 first encounter the undercut portion 72 of the cam plate 50 at the location 74. The location 74 preferably corresponds to the mold position at which the leading edge of the mold 36 has not passed the scraper edge 40 and the trailing edge of the mold 36 has substantially passed the forward edge of the orifice 34. Thus, at this position, substantially no more of the mixture will enter the mold 36, and yet no upward bulging can occur as no part of the mold 36 has emerged into the open, past the scraper edge 40.

Figure 7:
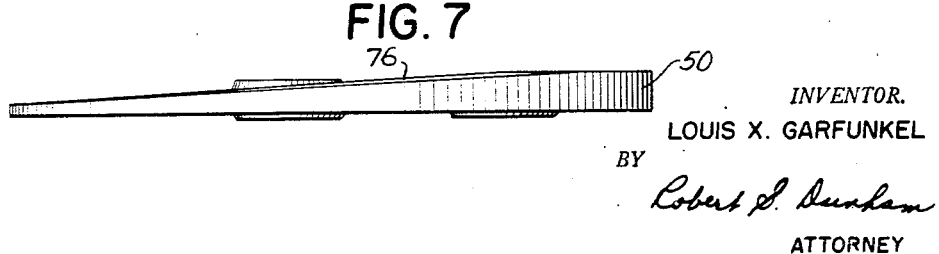
Fig. 7 is a side view of the cam plate having modified means for dropping the pistons gradually as and after the molds pass the orifice.

An alternative arrangement for dropping the pistons slightly is illustrated in Fig. 7, and in this arrangement, instead of having a relatively abrupt drop-off to the undercut portion 72, the cam plate 50 is provided with a downwardly tapered upper surface 76 which accomplishes substantially the same results.

The machine known to the prior art is provided with a mixture stop or plate 78 located just above the propeller blades 24 and positioned substantially directly above the leading edge of the orifice 34. It is convenient to hold the mixture stop 78 in position by means of an inwardly projecting pin 80 mounted on the hopper 28.

While the pin 80 may be positioned at the factory for patties of a given depth, better results, i. e. more tender patties, can be attained in the case of patties of other thicknesses, if the position of the pin 80 is made adjustable. An example of means for so doing is clearly shown in Figs. 1, 3 and 4. A horizontally elongated slot 82 having horizontal upper and lower edges is cut in the hopper 28 with its center corresponding to an average desired position of the pin 80. The slot 82 is covered by a plate 84 which is larger than the slot 82 and which may conveniently be of similar shape thereto. The plate 84 is shaped to conform to the outer surface of the hopper 28 and is in slidable relationship therewith.

The pin 80 has an extension 86 with horizontal upper and lower surfaces, the extension 86 projecting outwardly through the slot 82, the upper and lower surfaces of the extension 86 being in slidable engagement with the aforesaid edges of the slot 82. On the outwardly facing end of the extension 86 is a vertically flattened threaded stud 88 which projects through a similarly shaped opening in the plate 84. The pin 80, the extension 86 and the stud 88 are rigidly joined together, as by being integrally formed. An internally threaded knob 90 is screwed onto the stud 88, tightly against the plate 84, thus to draw the plate tightly against the hopper 28 in desired position.

As shown, the mixture stop 78 comprises an inclined or other suitably shaped blade member extending radially from the center of the container 28, and there pivoted to swing about the axis of the shaft 22. The action of the paddles, preferably including an upper, similarly rotated paddle 24a, is to force meat against the stop 78, holding it against and thus positioned by the pin 80.

To change the position of the pin 80 and to reposition the stop 78 as desired, it is merely necessary to loosen the knob 90, move the knob 90 in one horizontal direction or the other to the desired position, and retighten the knob 90 on the stud 88. When the knob 90 is moved as aforesaid, the stud 88, the plate 84, the extension 86 and the pin 80 will be moved likewise, with the extension 86 sliding in the slot 82.

During the repositioning operation, the plate 84 is prevented from cocking one way or the other, because it is prevented from rotating about the stud 88 by the flattened shape of its central opening and the flattened shape of the stud 88; and the stud 88 cannot rotate because its horizontal upper and lower surfaces are locked against rotation by the horizontal upper and lower edges of the slot 82.

Fig. 4 also shows that the hopper 28 is held in position in the container base 26 by means of a pin 92 projecting outwardly from the hopper 28, and a slot 94 in the container base 26.

Assuming that the pin 80 as shown in Fig. 1 is properly positioned for making patties of a given weight for which the cam plate 50 is properly positioned, if it is desired to increase the weight of the patties (by lowering the cam plate 50), it should be made easier for meat to find its way from the hopper 28 through the orifice 34. Accordingly, the stop 78 should be adjusted slightly counterclockwise (as seen in Fig. 1). Such movement will cause less meat to be diverted from the orifice 34 and the molds 36.

Contrariwise, if it is desired to decrease the weight of the patties (by raising the cam plate 50), the stop 78 should be adjusted slightly clockwise from the position shown in Fig. 1, to cause more meat to be diverted from the orifice 34 and the molds 36.

The effect of adjusting the stop 78 as aforesaid is that the mixture compression can be maintained at a uniform optimum value for patties of varying weights, thicknesses, and shapes.

It is also to be appreciated that the mixture compression is also dependent upon the size and shape of the orifice 34. Heretofore it has been usual to have such orifice substantially circular and of greater diameter than that of the molds. I have found that such an orifice configuration is conducive to the excessive pressure mentioned above, and that such excessive pressure can be substantially cut down by making the forward fine edge 44 of the orifice more nearly straight across, i. e. only slightly bowed in the direction of the mold motion (see Fig. 1), to make the orifice opening smaller. The lighter the patties that the machine is to produce, the smaller should be the orifice 34, and the straighter should be the fine edge 44.

As the meat or other moldable mixture encounters the edge 44, the edge 44 cuts through the mixture, some being diverted downwardly through the chute 42, some continuing horizontally in the container base 26. The lighter the patties to be formed, the less mixture should be diverted downwardly as aforesaid, to avoid the excess pressure. To attain this desired end, the orifice opening should be made smaller, i. e. the fine edge 44 should be straighter.

Contrariwise, for heavier patties, the fine edge 44 should be more bowed in the direction of the mixture movement to present a larger orifice opening for the mixture.

In general, the stop 78 should be located above the orifice 34 and toward the forward or fine edge 44 thereof.

Many modifications and variations will be apparent or will occur to those skilled in the art, and it is not intended to limit the invention to the specific embodiment set forth by way of example, except as may be defined by the following claims.

I claim:

1. In a machine for molding hamburger and other comminuted material, in combination, a member having an orifice at its bottom, a mold, means operatively associated with said mold for moving said mold horizontally past and beneath the orifice, a lip horizontally extending in the direction of mold motion from the bottom of said member, a scraper edge at the terminal end of said lip and in sliding engagement with said mold moving means, a material-guiding, downwardly facing chute formed on the under surface of said lip and inclined downwardly from the orifice to a location adjacent the scraper edge, said chute being S-shaped in vertical longitudinal section, and means operatively associated with said member for pushing material downwardly through the orifice, along said chute and into the mold.

2. In a machine for molding hamburger and other comminuted material, in combination, a member having an orifice at its bottom, a mold, means operatively associated with said mold for moving said mold horizontally past and beneath the orifice, a lip horizontally extending in the direction of mold motion from the bottom of said member, a scraper edge at the terminal end of said lip and in sliding engagement with said mold moving means, a material-guiding, downwardly facing chute having two ends and being formed on the under surface of said lip and inclined downwardly from a fine edge at the orifice to a location adjacent the scraper edge, said chute being horizontal at its ends in vertical longitudinal section, and means operatively associated with said member for pushing material downwardly through the orifice, along said chute and into the mold.

3. In a machine for molding hamburger and other comminuted material, in combination, a member having an orifice at its bottom, a mold, means operatively associated with said mold for moving the mold horizontally past and beneath the orifice, a lip horizontally extending in the direction of mold motion from the bottom of said member, a scraper edge at the terminal end of said lip and in sliding engagement with said mold moving means, a material-guiding, downwardly facing chute formed on the under surface of said lip and inclined downwardly from the orifice to a location adjacent the scraper edge, said chute being S-shaped in vertical longitudinal section, having horizontal end portions and a reflex point intermediate the end portions, and means operatively associated with said member for pushing material downwardly through the orifice, along the chute and into the mold.

4. In a machine for molding hamburger and other comminuted material, in combination, a member having an orifice at its bottom, a mold, means operatively associated with said mold for moving said mold along a horizontal path past and beneath the orifice, a lip horizontally extending from the bottom of said member in the direction of mold motion, above said path, a scraper edge at the outer end of said lip and in sliding engagement with said mold moving means, a material-guiding, downwardly facing chute formed on the under surface of said lip and inclined downwardly from the orifice along said path, said chute being S-shaped vertical section along the path, means adjacent to said member for pushing material downwardly through the orifice, along the chute and into the mold under pressure, a piston in and defining the depth of the mold, a plate for supporting said piston as the mold follows the path, a reduced portion on said plate to increase the depth of the mold when it is substantially between the orifice and the scraper edge, to decrease the pressure of the material in the mold.

5. In a machine for molding hamburger and other comminuted material, in combination, a member having an orifice at its bottom, material supply means mounted in said member, a mold, means operatively associated with said mold for moving said mold along a horizontal path past and beneath the orifice, a lip horizontally extending from the bottom of said member in the direction of mold motion above said path, a scraper edge at the outer end of said lip and in sliding engagement with said mold moving means, a material-guiding, downwardly facing chute formed on the under surface of said lip and inclined downwardly from the orifice to a location adjacent the scraper edge, said chute being S-shaped in vertical longitudinal section, means adjacent to said member for pushing material downwardly through the orifice, along said chute and into the mold under pressure, a material stop within the supply means above the pushing means and positioned generally above the orifice to control the amount of material deposited in the mold, means operatively associated with said stop for adjusting the position of said stop to vary the amount of material deposited in the mold, a piston in and defining the depth of the mold, a plate for supporting said piston as the mold follows the path, and a reduced portion on said plate to increase the depth of said piston in the mold after the mold passes the orifice to decrease the pressure of the material in the mold.

6. In a machine for molding hamburger and other comminuted material, in combination, a material-supplying member having an orifice at its bottom, a mold, means operatively associated with said mold for moving said mold along a horizontal path past and beneath the orifice, and means operatively associated with said member for pushing material downwardly through said orifice into the mold, the forward edge of the orifice having a substantially greater radius curvature than a radius from the center of said orifice, said curvature being in the direction of mold motion.

7. In a machine for molding hamburger and other comminuted material, in combination, a material-supplying member having an orifice at its bottom, a mold, means operatively associated with said mold for moving said mold along a horizontal path past and beneath the orifice, means adjacent to said member for pushing material downwardly through the orifice into the mold under pressure, the forward edge of the orifice having a substantially greater radius curvature than a radius from the center of said orifice, said curvature being in the direction of mold motion, a piston in and defining the depth of the mold, a plate for supporting said piston as the mold follows the path, and a reduced portion on said plate to increase the depth of the piston in the mold after it passes the orifice to decrease the pressure of the material in the mold.

8. In a machine for molding hamburger and other comminuted material, in combination, a material-supplying member having an orifice at its bottom, a mold, means operatively associated with said mold for moving said mold past and beneath the orifice along a horizontal path, the forward edge of said orifice having a substantially greater radius curvature than a radius from the center of said orifice, said curvature being in the direction of mold motion, a lip horizontally extending in the direction of mold motion from the bottom of said member, a scraper edge at the terminal end of said lip and in sliding engagement with said mold moving means, a material-guiding, downwardly facing chute formed on the under surface of said lip and inclined downwardly from the forward edge of the orifice to a location adjacent the scraper edge, said chute being S-shaped in vertical longitudinal section, and means operatively associated with said member for pushing material downwardly through the orifice, along the chute and into the mold.

9. In a machine for molding hamburger and other comminuted material, in combination, a member having an orifice at its bottom, a mold, means operatively associated with said mold for moving said mold past and beneath the orifice along a horizontal path, the forward edge of the orifice having a substantially greater radius curvature than a radius from the center of said orifice, said curvature being slightly bowed in the direction of mold motion, a lip horizontally extending from the bottom of said member in the direction of mold motion above said path, a scraper edge at the terminal end of said lip and in sliding engagement with said mold moving means, a material-guiding, downwardly facing chute formed on the under surface of said lip and inclined downwardly from the forward edge of the orifice along said path, said chute being S-shaped in vertical section along the path, means operatively associated with said member for pushing material downwardly through the orifice, along the chute and into the mold under pressure, a piston in and defining the depth of the mold, a plate for supporting said piston as the mold follows the path, and a reduced portion on said plate to increase the depth of the mold when it is substantially between the orifice and the scraper edge to decrease the pressure of the material in the mold.

10. In a machine for molding hamburger and other comminuted material, in combination, a member having an orifice at its bottom, a mold, means operatively associated with said mold for moving said mold past and beneath the orifice along a horizontal path, the forward edge of the orifice having a substantially greater radius curvature than a radius from the center of said orifice, said curvature being slightly bowed in the direction of mold motion, a lip horizontally extending from the bottom of said member in the direction of mold motion above said path, a scraper edge at the terminal end of said lip and in sliding engagement with said mold moving means, a material-guiding, downwardly facing chute formed on the under surface of said lip and inclined downwardly from the forward edge of the orifice along said path, said chute being S-shaped in vertical section along the path, means adjacent to said member for pushing material downwardly through the orifice, along the chute and into the mold under pressure, a material stop above the forward edge of the orifice to control the amount of material deposited in the mold, and means operatively associated with said stop for adjusting the position of said stop to vary said amount of material.

11. In a machine for molding hamburger and other comminuted material, in combination, a member having an orifice at its bottom, a mold, means operatively associated with said mold for moving said mold past and beneath the orifice along a horizontal path, the forward edge of the orifice having a substantially greater radius curvature than a radius from the center of said orifice, said curvature being slightly bowed in the direction of mold motion, means adjacent to said member for pushing material downwardly through the orifice into the mold under pressure, a material stop above the forward edge of the orifice to control the amount of material deposited in the mold, a piston in and defining the depth of the mold, a plate for supporting the piston along said path, and a reduced portion on said plate to increase the depth of said piston in said mold after the mold passes the orifice to decrease the pressure of the material in the mold.

12. In a machine for molding hamburger and other comminuted material, in combination, a member having an orifice at its bottom, a mold, means operatively associated with said mold for moving said mold past and beneath the orifice along a horizontal path, the forward edge of the orifice having a substantially greater radius curvature than a radius from the center of said orifice, said curvature being slightly bowed in the direction of mold motion, a lip horizontally extending from the bottom of said member in the direction of mold motion above said path, a scraper edge at the terminal end of said lip and in sliding engagement with said mold moving means, a material-guiding, downwardly facing chute formed on the under surface of the lip and inclined downwardly from the forward edge of the orifice along said path, said chute being S-shaped in vertical section along the path, means operatively associated with said member for pushing material downwardly through the orifice, along the chute and into the mold under pressure, a piston in and defining the depth of the mold, a plate for supporting said piston along said path, and a reduced portion on said plate to increase the depth of said piston in the mold substantially as the mold is between the orifice and the scraper edge to decrease the pressure of the material in the mold, a material stop above the forward edge of the orifice to control the amount of material deposited in the mold, and means operatively associated with said material stop for adjusting the position of said stop to obtain an optimum amount of material feed.

13. In combination with a machine for molding hamburger and other comminuted material having a container for the material with an orifice in the bottom thereof, a mold, means operatively associated with said mold for moving said mold horizontally past and beneath the orifice, a projection extending horizontally in the direction of mold motion from the bottom of said container, a scraper edge at the outer end of said projection in sliding engagement with said mold as moved, a material guiding chute connected to said orifice and leading out under said projection, and means operatively associated with said container for pushing material downwardly through the orifice along said chute and into the mold, the improvement comprising the shape of the forward wall of said chute in cross-section in the direction of travel of said mold being S-curved.

14. In combination with a machine for molding hamburger and other comminuted material having a container for the material with an orifice in the bottom thereof, a mold, means operatively associated with said mold for moving said mold horizontally past and beneath the orifice, a projection extending horizontally in the direction of mold motion from the bottom of said container, a scraper edge at the outer end of said projection in sliding engagement with said mold as moved, a material guiding chute connected to said orifice and leading out under said projection, and means operatively associated with said container for pushing material downwardly through the orifice along said chute and into the mold, the improvement comprising the shape of the orifice being substantially flattened across the side looking in the direction of travel of the mold.

References Cited in the file of this patent

UNITED STATES PATENTS

| Number | Name | Date |
|---|---|---|
| 2,183,977 | Sopchack | Dec. 19, 1939 |
| 2,366,379 | Bemis | Jan. 2, 1945 |
| 2,475,463 | Santo | July 5, 1949 |
| 2,491,179 | Holly | Dec. 13, 1949 |
| 2,530,061 | Holly | Nov. 14, 1950 |
| 2,530,062 | Holly | Nov. 14, 1950 |